United States Patent
Namba et al.

(10) Patent No.: US 11,736,635 B2
(45) Date of Patent: Aug. 22, 2023

(54) READING APPARATUS

(71) Applicant: BROTHER KOGYO KABUSHIKI KAISHA, Nagoya (JP)

(72) Inventors: Mamoru Namba, Nagoya (JP); Tadanobu Chikamoto, Nagoya (JP); Genki Hoshino, Nagoya (JP); Hiroshi Shiomi, Nagoya (JP); Takashi Ohama, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/712,751

(22) Filed: Apr. 4, 2022

(65) Prior Publication Data

US 2022/0329704 A1 Oct. 13, 2022

(51) Int. Cl.
*H04N 1/00* (2006.01)
*H04N 1/12* (2006.01)
*H04N 1/10* (2006.01)

(52) U.S. Cl.
CPC ..... *H04N 1/00543* (2013.01); *H04N 1/00551* (2013.01); *H04N 1/00557* (2013.01);
(Continued)

(58) Field of Classification Search
CPC .. H04N 1/00; H04N 1/00525; H04N 1/00551; H04N 1/00519; H04N 1/024; H04N 1/12; H04N 1/00554; H04N 1/02427; H04N 1/02463; H04N 1/031; H04N 1/1017; H04N 1/0057; H04N 1/00628; H04N 1/1065; H04N 1/107;
(Continued)

(56) References Cited

U.S. PATENT DOCUMENTS 5,367,370 A * 11/1994 Yoshida ................. G03G 15/60
399/377
5,428,424 A * 6/1995 Yoshida ................. G03G 15/60
399/377
(Continued)

FOREIGN PATENT DOCUMENTS

JP 2004-099240 A 4/2004
JP 2013-080189 A 5/2013
(Continued)

*Primary Examiner* — Negussie Worku
(74) *Attorney, Agent, or Firm* — Baker Botts L.L.P.

(57) ABSTRACT

A reading apparatus, having a platen glass, a document cover, a conveyer, a reading sensor, a document supporting member, a pressing plate, and a linkage assembly, is provided. The document cover is movable between an open position and a closed position. The document supporting member is movable between a first position, where the document supporting member faces a reading surface of the reading sensor, and a second position, where the document supporting member is separated from the reading surface. The pressing plate is movable between a third position, where the pressing plate is attached to a lower side of the document cover, and a fourth position, where the pressing plate is removed from the lower side. The linkage assembly moves the document supporting member from the first position to the second position in conjunction with the pressing member moving from the third position to the fourth position.

5 Claims, 11 Drawing Sheets

(52) U.S. Cl.
CPC ......... *H04N 1/1039* (2013.01); *H04N 1/1061* (2013.01); *H04N 1/123* (2013.01); *H04N 1/1225* (2013.01); *H04N 2201/0094* (2013.01)

(58) Field of Classification Search
CPC ... H04N 2201/0094; H04N 2201/0418; H04N 1/00535; H04N 1/00557; H04N 1/00559; H04N 1/00835; H04N 2201/0404; H04N 1/00095; H04N 1/00217; H04N 1/00355; H04N 1/00371; H04N 1/00527; H04N 1/00533; H04N 1/00567; H04N 1/00572; H04N 1/0058; H04N 1/00771; H04N 1/00962; H04N 1/00989; H04N 1/02825; H04N 1/0318; H04N 1/10; H04N 1/1039; H04N 1/1077; H04N 1/1235; H04N 1/2032; H04N 1/3873; H04N 1/407; H04N 1/4076; H04N 2201/0015; H04N 2201/0068; H04N 2201/03116; H04N 2201/03133; H04N 2201/03145; H04N 2201/03175; H04N 2201/03195; H04N 2201/0414; H04N 2201/0426; H04N 2201/0434; H04N 2201/044; H04N 1/00013; H04N 1/00015; H04N 1/00018; H04N 1/00037; H04N 1/00076; H04N 1/0032; H04N 1/00339; H04N 1/00477; H04N 1/0053; H04N 1/00546; H04N 1/00562; H04N 1/00681; H04N 1/00716; H04N 1/00748; H04N 1/00779; H04N 1/00795; H04N 1/00814; H04N 1/00885; H04N 1/00888; H04N 1/00909; H04N 1/00928; H04N 1/02815; H04N 1/0288; H04N 1/04; H04N 1/0473; H04N 1/1013; H04N 1/1026; H04N 1/1043; H04N 1/1056; H04N 1/193; H04N 1/3263; H04N 1/32657; H04N 1/32683; H04N 1/387; H04N 1/40056; H04N 1/4092; H04N 1/4097; H04N 1/482; H04N 1/6033; H04N 2201/0081; H04N 2201/02416; H04N 2201/042; H04N 2201/0422; H04N 2201/0442; H04N 2201/0446; H04N 2201/0448; H04N 2201/045; H04N 2201/0456; H04N 2201/04703; H04N 2201/04731; H04N 2201/04732; H04N 2201/04755; H04N 2201/04791; H04N 5/2251; H04N 5/2252; G03G 15/602; G03G 15/60; G03G 15/23; G03G 15/234; G03G 21/1628; G03G 2215/00189; G03G 2215/00438; G03G 2215/00586; G03G 2221/1687; G03G 2221/169; G03G 15/0142; G03G 15/5016; G03G 15/5091; G03G 15/605; G03G 15/607; G03G 15/70; G03G 21/00; G03G 21/16; G03G 21/1633; G03G 2215/00172; G03G 2215/00177; G03G 2215/00312; B65H 2402/54; B65H 2403/721; B65H 3/5215; B65H 3/5223; B65H 3/56; B65H 1/04; B65H 2301/4212; B65H 2402/441; B65H 2402/60; B65H 2403/42; B65H 2405/111643; B65H 2405/1117; B65H 2405/11172; B65H 2405/115; B65H 2405/12; B65H 2405/324; B65H 2801/12; B65H 3/0669; B65H 31/02; B65H 7/04; B65H 7/20
USPC ......................................................... 358/498
See application file for complete search history.

(56) References Cited

U.S. PATENT DOCUMENTS

| | | | | |
|---|---|---|---|---|
| 8,159,731 | B2* | 4/2012 | Sato | H04N 1/00795 |
| | | | | 358/497 |
| 8,625,263 | B2* | 1/2014 | Pu | G06F 1/1669 |
| | | | | 248/533 |
| 2012/0250116 | A1* | 10/2012 | Ikeno | H04N 1/193 |
| | | | | 358/498 |
| 2013/0088762 | A1 | 4/2013 | Yamazaki et al. | |
| 2015/0264194 | A1 | 9/2015 | Kubo et al. | |
| 2016/0094739 | A1* | 3/2016 | Xie | H04N 1/00525 |
| | | | | 358/474 |
| 2019/0127165 | A1* | 5/2019 | Yoshida | H04N 1/00615 |

FOREIGN PATENT DOCUMENTS

| | | |
|---|---|---|
| JP | 2015-027070 A | 2/2015 |
| JP | 2015-171130 A | 9/2015 |

\* cited by examiner

READING APPARATUS

CROSS REFERENCE TO RELATED APPLICATION

This application claims priority under 35 U.S.C. § 119 from Japanese Patent Application No. 2021-066548, filed on Apr. 9, 2021, the entire subject matter of which is incorporated herein by reference.

BACKGROUND

The present disclosure is related to a reading apparatus having a document cover, which may cover a platen glass on top of a document supporting base and accommodates a reading sensor for reading an image of an original document being conveyed in a conveyer path.

A reading apparatus having a document cover, which may cover a platen glass and accommodates a reading sensor therein, is known. More specifically, a reading apparatus having a document cover, which accommodates an auto-document feeder including an image reader, is known. The auto-document feeder may have an exposing unit, which is movable to pivot to expose a reader surface of the image reader outward. A user may reach the reader surface of the image reader for maintenance works such as cleaning or wiping through a maintenance space, which is open when the exposing unit pivots outward.

SUMMARY

The reading apparatus may have a pressing plate to cover the platen glass at a bottom side of the document cover. While the pressing plate is located to be lower than the image reader, in order to allow the exposing unit in the auto-document feeder to pivot, the user may need to remove the pressing plate from the document cover for the maintenance works, but the user may be reluctant to perform the removing works.

The present disclosure is advantageous in that a reading apparatus, for which maintenance works to a reader sensor arranged inside a document cover may be easier, is provided.

According to an aspect of the present disclosure, a reading apparatus, having a platen glass, a document cover, a conveyer, a reading sensor, a document supporting member, a pressing plate, and a linkage assembly, is provided. On the platen glass, an original document is placeable. The document cover is movable with respect to the platen glass between an open position and a closed position. The document cover located at the closed position covers the platen glass. The conveyer is arranged inside the document cover and is configured to convey the original document along a conveyer path. The reading sensor is arranged inside the document cover and is configured to read the original document conveyed along the conveyer path optically. The document supporting member is movable between a first position, at which the document supporting member faces a reading surface of the reading sensor across the conveyer path, and a second position, at which the document supporting member is separated farther from the reading surface than the document supporting member at the first position. The pressing plate is located at a lower side of the document cover. The pressing plate is movable between a third position, at which, when the document cover is at the closed position, the pressing plate is located to be lower than the reading sensor and contacts the platen glass, and at which the pressing plate is attached to the lower side of the document cover, and a fourth position, at which the pressing plate is removed from the lower side of the document cover. The linkage assembly is configured to move the document supporting member from the first position to the second position in conjunction with the pressing member moving from the third position to the fourth position.

According to another aspect of the present disclosure, a reading apparatus, having a platen glass, a document cover, a conveyer, a reading sensor, a document supporting member, and a pressing plate, is provided. On the platen glass, an original document is placeable. The document cover is movable with respect to the platen glass between an open position and a closed position. The document cover located at the closed position covers the platen glass. The conveyer is arranged inside the document cover and is configured to convey the original document along a conveyer path. The reading sensor is arranged inside the document cover and is configured to read the original document conveyed along the conveyer path optically. The document supporting member is movable between a first position, at which the document supporting member faces a reading surface of the reading sensor across the conveyer path, and a second position, at which the document supporting member is separated farther from the reading surface than the document supporting member at the first position. The pressing plate is located at a lower side of the document cover. The pressing plate is, when the document cover is at the closed position, located to be lower than the reading sensor and contacts the platen glass. The pressing plate includes a first section fixed to the lower side of the document cover, a second section movable between a third position, at which the second section is attached to the lower side of the document cover, and a fourth position, at which the second section is removed from the lower side of the document cover. The document supporting member is arranged on the second section. The document supporting member is located at the first position when the second section is at the third position and is located at the second position when the second section is at the fourth position.

DETAILED DESCRIPTION

In the following paragraphs, with reference to the accompanying drawings, an embodiment of the present disclosure will be described. It is noted that the MFD 1 described below is merely one embodiment of the present disclosure, and various connections may be set forth between elements in the following description. These connections in general and, unless specified otherwise, may be direct or indirect and that this specification is not intended to be limiting in this respect. In the following description, directivity indicated by a pointing arrow, from a stem toward a pointing head, will be expressed by a term "orientation," whereas back or forth movability along a line or a curve extending through a stem and pointing heads of a double-headed arrow will be expressed by a term "direction." In other words, an orientation is a component of a direction. Moreover, positional relation within the MFD 1 and each part or item included in the MFD 1 will be mentioned on basis of a posture of the MFD 1 set on a horizontal plane in an ordinarily usable condition. For example, a vertical axis between an upper side and a lower side of the MFD 1 in the ordinarily usable posture is defined as an up-down direction 7. A side of the MFD 1, on which an opening 4 is formed, is defined as a front side, and an axis between the front side and a rear side opposite from the front side is defined as a front-rear direction 8. A right-hand side and a left-hand side to a user who faces the front side of the MFD 1 are defined as a rightward side and a leftward side, respectively. An axis between the rightward side and the leftward side is defined as a right-left direction 9. The up-down direction 7, the front-rear direction 8, and the right-left direction 9 intersect orthogonally to one another. When the MFD 1 is set in the ordinarily usable condition, the up-down direction 7 coincides with a vertical direction, and the front-rear direction 8 and the right-left direction 9 coincide with horizontal directions. In the following description, the up-down direction 7 and the right-left direction 9 may be referred to as a vertical direction 7 and a crosswise direction 9, respectively.

[Overall Configuration of MFD 1]

Figure 1:
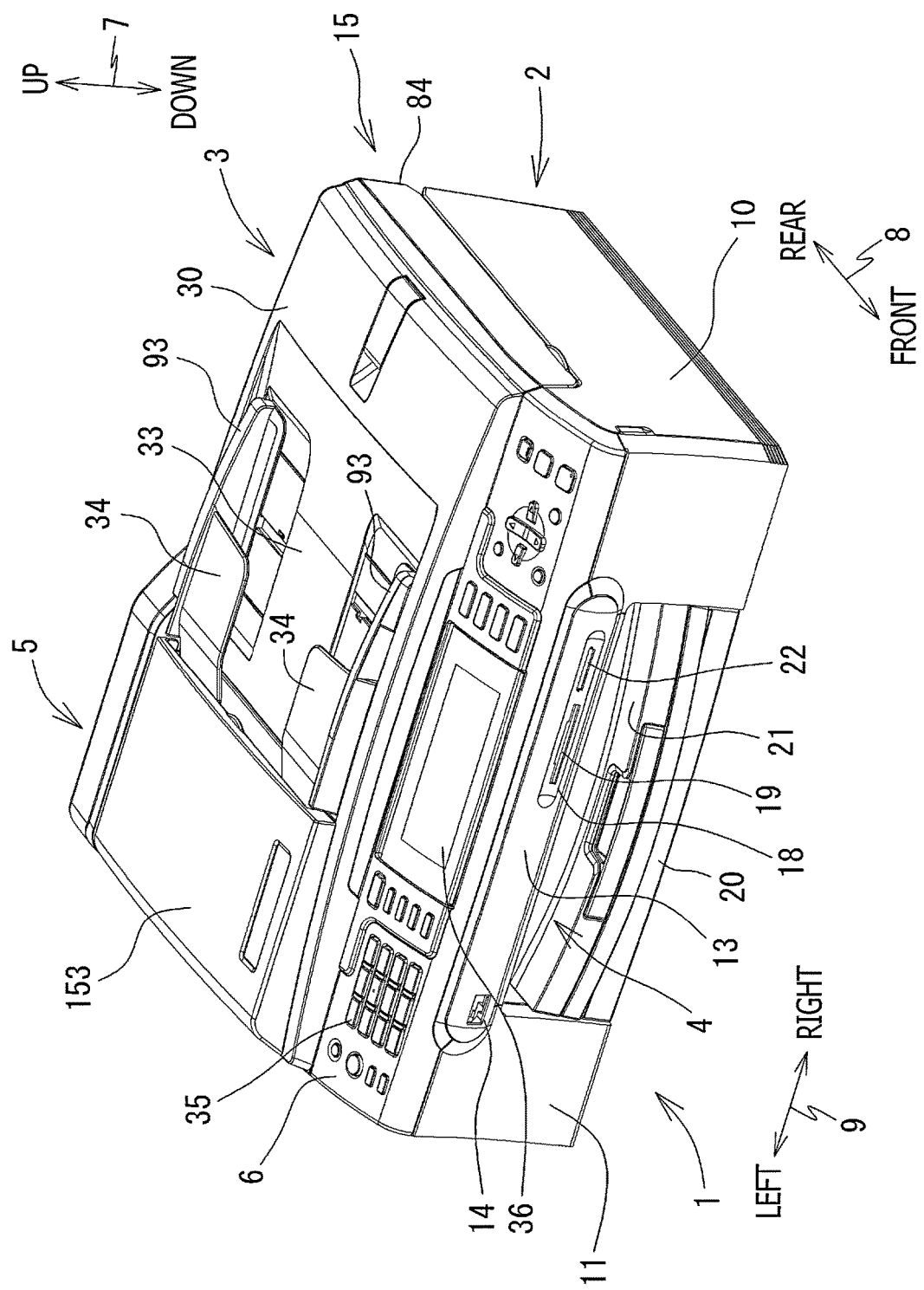
FIG. 1 is a perspective view of an exterior appearance of a multifunction peripheral device (MFD) 1 according to an embodiment of the present disclosure.

FIG. 1 is a perspective view of an exterior appearance of the MFD 1 including the ADF 5 according to the embodiment of the present disclosure.

The MFD 1 is a multifunction device having a printer 2, which may be an inkjet printer, arranged at a lower position, and a scanner 3, arranged on top of the printer 2, integrally. The MFD 1 is equipped with multiple functions including a printing function, a scanning function, a copying function, and a facsimile transmitting/receiving function. However, embodiment of the present disclosure may not necessarily require the printing function, the copying function, or the facsimile transmitting/receiving function, but the present disclosure may be embodied by the scanner 3 with the ADF 5 alone. In other words, the functions other than the scanning function are optional.

With the copying function, the MFD 1 may reproduce an image of an original document read by the scanner 3 on a recording sheet with use of the printer 2. With the facsimile transmitting/receiving function, the MFD 1 may transmit image data composing an image of the original document read by the scanner 3 externally to a facsimile machine through, for example, telecommunication lines. Moreover, the MFD 1 may receive external facsimile data and reproduce an image of the facsimile data on a recording sheet with use of the printer 2.

With the scanning function, image data composing the image of the original document 12 read by the scanner 3 may be transferred to a computer connected with the MFD 1 through wires or wirelessly. Moreover, the MFD 1 may transfer the image data composing the image of the original document 12 read by the scanner 3 to a storage medium such as a memory card or Universal Serial Bus (USB) memory and save the image data therein.

[Configuration of Scanner 3]

The scanner 3 includes, as shown in FIGS. 1-4, an ADF document tray 33, an ADF ejection tray 34, a conveyer path 151, a conveyer 16, a first contact image sensor (CIS) 85 being a reading sensor, and a second contact image sensor (CIS) 95 being another reading sensor.

As shown in FIG. 1, an exterior appearance of the MFD 1 is approximately in a form of a short and wide rectangular box, of which width and depth are substantially greater than height. The printer 2 forming a lower part of the MFD 1 has a housing 10, which forms a framework of the printer 2. In a front panel 11, which forms a front face of the housing 10, the opening 4 is formed. Inside the opening 4, a feeder tray 20 and an ejection tray 21 are arranged vertically in tiers. On an upper side of the opening 4, a connector panel 13, in which multiple types of connectors are provided, is arranged. In a rightward area in the connector panel 13, a slot section 18 is arranged. The slot section 18 allows multiple types of memory cards to be inserted and provides electrical connection between a controller of the MFD 1 and the memory cards. The memory cards may include card-formed storage devices, which contain flash memory as storage medium. In the slot section 18, a first card slot 19 and a second card slot 22 in different slot forms are arranged side by side to allow the memory cards in different types to be attached. Inside a rightward part of the front panel 11 in the crosswise direction 9, ink cartridges may be housed.

In an upper-frontward area of the MFD 1, an operation panel 6 for operating the printer 2 and the scanner 3 is arranged. The operation panel 6 may include various type of operation buttons 35 and a liquid crystal display 36. The MFD 1 may operate based on commands entered through the operation panel 6. Optionally, when the MFD 1 is connected with an external computer, the MFD 1 may operate based on commands from the computer entered through a printer driver or a scanner driver.

Next, with reference to FIGS. 2-4, an overall configuration of the scanner 3 will be described.

The scanner 3 has a document cover 30, which is attached movably with respect to a document-reading base 15 through hinges arranged on a rear side of the scanner 3. The document cover 30 may pivot in a direction indicated by an arrow P1 in FIG. 2 to open or close the document-reading base 15 serving as a flatbed scanner (FBS). In particular, the document cover 30 is movable with respect to a platen glass 80 (see FIG. 4) between an open position and a closed position. The document cover 30 located at the closed position may cover the platen glass 80. The document cover 30 has the ADF 5 integrally; therefore, the ADF 5 may move along with opening and closing movements of the document cover 30. The ADF document tray 33, the ADF ejection tray 34, the conveyer path 151, the conveyer 16, and the second CIS 95 are arranged inside the document cover 30. On the other hand, the first CIS 85 is arranged inside the document-reading base 15.

On an upper side of the document-reading base 15, the platen glass 80 is arranged. When the document cover 30 is closed with respect to the document-reading base 15, the platen glass 80 is covered by the document cover 30. The document cover 30 has a pressing plate 82, which may face the platen glass 80, at a lower side thereof.

When the document cover 30 is at the closed position, the pressing plate 82 is located to be lower than the second CIS 95 and may contact the platen glass 80. The pressing plate 82 may press and stabilize an original document 12 placed on top of the platen glass 80. The pressing plate 82 will be described in detail later.

The platen glass 80 is a transparent plate made of for example, glass or acrylic resin. At a leftward position on the platen glass 80, a positioning member 83 to define a border between a readable range 80A and a readable range 80B is arranged. The readable range 80A is a range, in which an image of the original document 12 may be read with use of the ADF 5. The readable range 80B is a range, in which the image of the original document 12 may be read with use of the scanner 3 as the FBS. The positioning member 83 may serve as a positioning reference to set the original document 12 on the platen glass 80. Moreover, the positioning member 83 may, when the ADF 5 is used, guide the original document 12 passing over the readable range 80A to return to the conveyer path 151 in the ADF 5.

Inside the document-reading base 15, a first image reading unit 32 is installed. When the scanner 3 is to be used as the FBS, the document cover 30 may be opened, the original document 12 may be placed on the platen glass 80, and the document cover 30 may be closed. Thereby, the original document 12 may be stabilized on the platen glass 80. While the original document 12 is stabilized, the first image reading unit 32 may move in a range below the platen glass 80 and read the image of the original document 12 on the platen glass 80.

The first image reading unit 32 includes the first CIS 85 and a CIS carriage 86 having a form of an elongated rectangular bar. The first CIS 85 is located underneath the platen glass 80 and faces a downward surface of the platen glass 80. The first CIS 85 is located at an upstream position with respect to a curved section 54 of the conveyer path 151 in a conveying orientation 17. The first CIS 85 may optically read the image of the original document 12 from a lower side of the conveyer path 151. The first CIS 85 is a so-called contact-typed line image sensor, in which light sources such as LEDs may emit light at the original document 12, the light reflected on the original document 12 may be guided to photoelectric conversion elements through lenses, and the photoelectric conversion elements may output electric signals according to intensities of the reflected light to the controller. The first CIS 85 is mounted on the CIS carriage 86 and reciprocate in the range underneath the platen glass 80.

Figure 3:
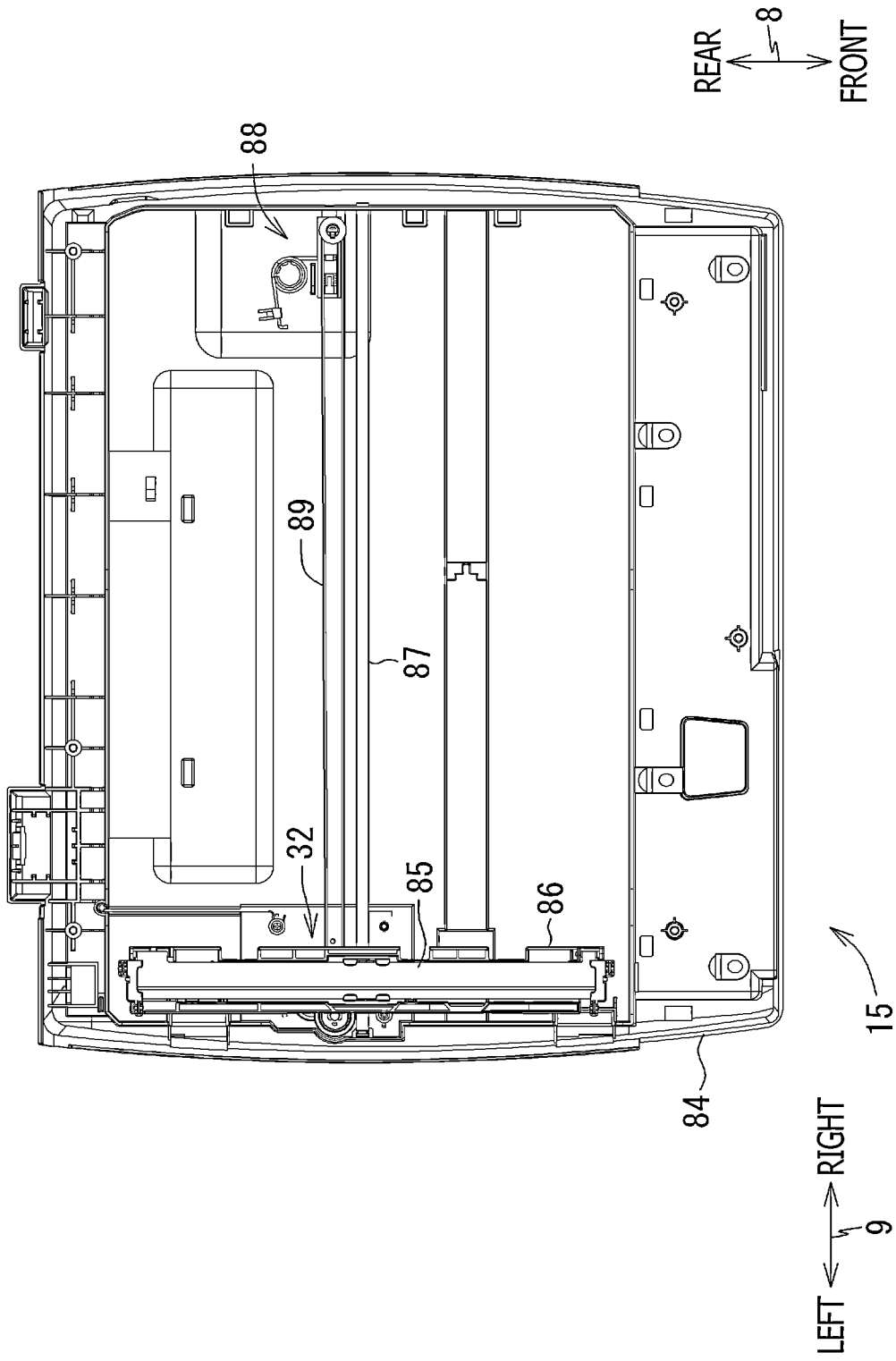
FIG. 3 is a plan view to illustrate main parts in the scanner 3 located to be lower than a platen glass 80 according to the embodiment of the present disclosure.

As shown in FIG. 3, a guide shaft 87 extends across a casing 84 in the crosswise direction 9. With the CIS carriage 86 being attached to the guide shaft 87, the first image reading unit 32 is movably supported by the guide shaft 87 to move in a direction intersecting orthogonally with a lengthwise direction of the CIS carriage 86, i.e., the crosswise direction 9, in the range underneath the platen glass 80. Along the guide shaft 87, a CIS carriage-driving assembly 88 is arranged. The CIS carriage-driving assembly 88 includes a timing belt 89 strained around pulleys (unsigned). The CIS carriage 86 is fixed to the timing belt 89 in the CIS carriage-driving assembly 88 and is moved by a circulating motion of the timing belt 89 to reciprocate in the crosswise direction 9. In this arrangement, when the scanner 3 is used as the FBS, the CIS carriage 86 may move in parallel with the lower surface of the platen glass 80 while the first CIS 85 mounted on the CIS carriage 86 may read the image of the original document 12 placed on the platen glass 80.

Figure 2:
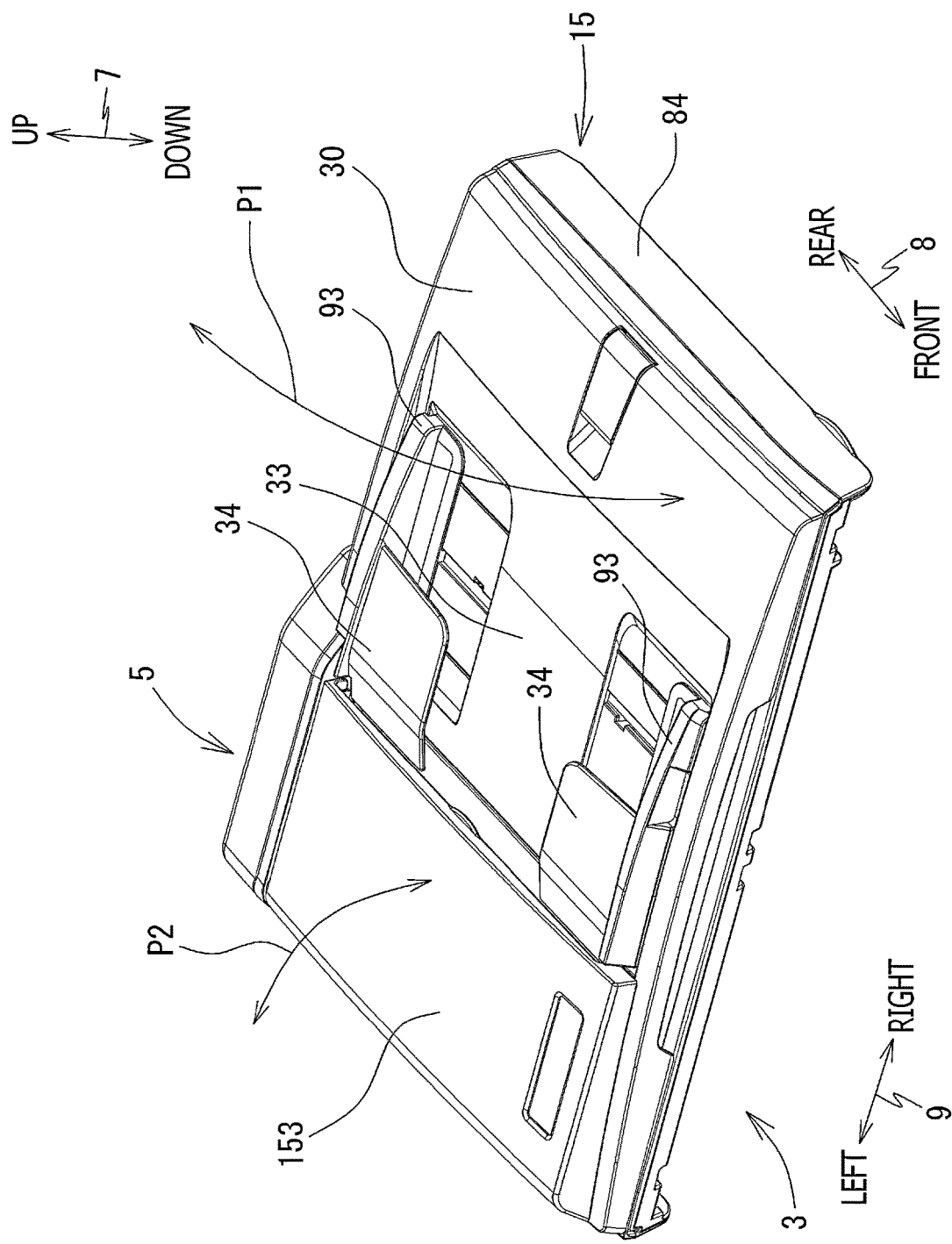
FIG. 2 is a perspective view of an exterior appearance of a scanner 3 according to the embodiment of the present disclosure.

The document cover 30 has, as shown in FIGS. 1-2, the ADF document tray 33 and the ADF ejection tray 34, which are arranged vertically in tiers. In the ADF document tray 33, paired ADF document guides 93, which are slidably movable in the front-rear direction 8, are arranged to be spaced from each other in the front-rear direction 8. The ADF document guides 93 stand on the ADF document tray 33 to regulate a widthwise position of the original document 12 placed on the ADF document tray 33.

The ADF document guides 93 may have a known linkage mechanism, such as rack-and-pinion, by which moving one of the ADF document guides 93 slidably in one way along the front-rear direction 8 causes the other of the ADF document guides 93 to move slidably in the other way along the front-rear direction 8.

The ADF ejection tray 34 is formed integrally with the paired ADF document guides 93 and to be spaced above from the ADF document tray 33. The ADF ejection tray 34 may have a form of eave-like plates, which project inward in the front-rear direction 8 from upper edges of the ADF document guides 93. The ADF ejection tray 34 is located to be lower than an upper surface of an upper tray 179 (see FIG. 4), which forms a lower ejection guide in an ejecting chute section 158 described below.

The original document 12 may include one or more sheets. One of the sheets in the original document 12 ejected from the ADF 5 may be held at frontward and rearward edges thereof by the ADF ejection tray 34 at a position separated from the other sheets in the original document 12 remaining on the ADF document tray 33. The ADF ejection tray 34 has a length shorter than a length of the original document 12 in an ejecting orientation to eject the original document 12. Therefore, a leading edge of the original document 12 in the ejecting orientation may fall off from the ADF ejection tray 34 and rest on the ADF document tray 33.

Figure 4:
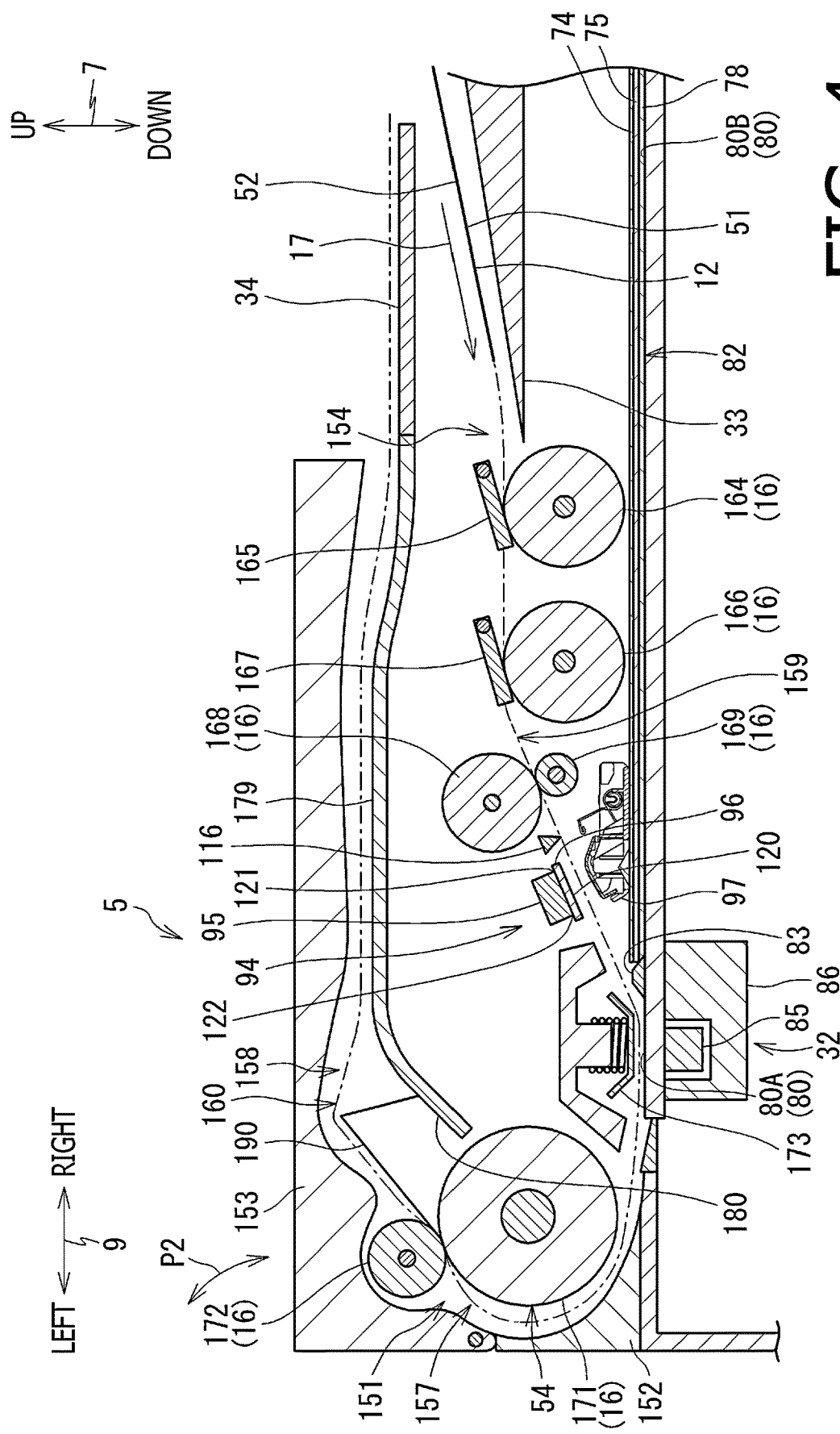
FIG. 4 is a cross-sectional view to illustrate an inner structure of an auto-document feeder (ADF) 5 according to the embodiment of the present disclosure.

As shown in FIG. 4, the casing of the ADF 5 includes an ADF body 152, which is formed integrally with the document cover 30, and an ADF cover 153, which is pivotable with respect to the ADF body 152. The ADF cover 153 mainly forms an upper face of the casing of the ADF 5. The ADF cover 153 is pivotable with respect to the ADF body 152 around a pivot axis, which is arranged sideward, e.g., leftward in FIG. 4, in the ADF body 152, in a direction indicated by an arrow P2. With the pivotable ADF cover 153, an inner part of the ADF 5 may be exposed.

The ADF cover 153 may change postures thereof between a closed posture and an open posture by pivoting with respect to the ADF body 152. When the ADF 5 is used, the ADF cover 153 is placed in the closed posture. The ADF cover 153 in the closed posture may be braced to the ADF body 152.

Inside the ADF 5, along the conveyer path 151, the conveyer 16 for conveying the original document 12 in a conveying orientation 17 from the ADF document tray 33 toward the ADF ejection tray 34 is arranged. The conveyer 16 includes a draw-in roller 164, a separating roller 166, a second conveying roller 168, a second pinch roller 169, a third conveying roller 171, and a third pinch roller 172. In the paragraphs below, the draw-in roller 164 and the separating roller 166 may also be called as first rollers 164, 166; the second conveying roller 168 and the second pinch roller 169 may also be called as second rollers 168, 169; and the third conveying roller 171 and the third pinch roller 172 may also be called as the third rollers 171, 172.

The conveyer path 151 is approximately in a shape of 90-degrees rotated U in a cross-sectional view and includes a lower conveyer path 159, a curved path 157, and an upper conveyer path 160. The conveyer path 151 may be formed of the ADF body 152 and the ADF cover 153.

From the ADF document tray 33 continuously to the conveyer path 151, a draw-in chute section 154 is formed. The draw-in chute section 154 in the ADF 5 is formed continuously with an area above the ADF document tray 33. The draw-in chute section 154 has an upper surface serving as a guide surface to guide the original document 12 and serves as a passage having a predetermined dimension in the vertical direction 7. In the present embodiment, a downward surface and an upward surface of the original document 12 placed on the ADF document tray 33 may be called as a first side 51 and a second side 52, respectively, and the original document 12 may be placed on the ADF document tray 33 in a posture, in which the first side 51 faces downward, with a leading edge in the conveying orientation 17 being inserted in the draw-in chute section 154.

In the draw-in chute section 154, a sheet-feeding assembly including a plurality of rollers is arranged. The sheet-feeding assembly includes the draw-in roller 164, a draw-nipping piece 165 pressed against the draw-in roller 164, the separating roller 166, and a separate-nipping piece 167 pressed against the separating roller 166. In the meantime, the configuration of the sheet-feeding assembly may not necessarily be limited to the draw-in roller 164, the draw-nipping piece 165, the separating roller 166, and the separate-nipping piece 167, but the rollers 164, 166 and the nipping pieces 165, 167 are merely examples of the components in the sheet-feeding assembly, and the sheet-feeding assembly may be modified to any known sheet-feeding assembly. For example, the quantity and/or arrangement of the rollers and the nipping pieces may be modified. For another example, the nipping pieces may be replaced with pinch rollers.

The first rollers 164, 166 may be driven by a driving force from an LF conveying motor (not shown) to rotate.

The draw-nipping piece 165 is located at a position to face the draw-in roller 164 and is vertically movable to be closer to or farther from the draw-in roller 164. The draw-nipping piece 165 is urged downward by a spring, which is not shown, and is in contact with the draw-in roller 164 when not nipping the original document 12.

The separator-nipping piece 167 is located at a position to face the separating roller 166 and is vertically movable to be closer to or farther from the separating roller 166. The separator-nipping piece 167 is urged downward by a spring, which is not shown, and is pressed against a rolling surface of the separating roller 166 when not nipping the original document 12.

The lower conveyer path 159 of the conveyer path 151 is formed as a passage having a predetermined width in the front-rear direction 8 and inclining moderately, continuously from a position in vicinity to an exit of the draw-in chute section 154 to a position in vicinity to an exit of the readable range 80A.

Along the lower conveyer path 159, the second conveying roller 168, the second pinch roller 169, a document sensor 116, a second image reading unit 94, the positioning member 83, a first document guide 173, and a first image reading unit 32 are arranged in this recited order from upstream to downstream in the conveying orientation 17.

The second pinch roller 169 is rotatably arranged in a posture such that an axial direction thereof coincides with a widthwise direction, i.e., the front-rear direction 8, of the lower conveyer path 159 and such that a rolling surface thereof is partly exposed to the lower conveyer path 159.

At a position to face the second pinch roller 169 across the lower conveyer path 159, the second conveying roller 168 is arranged. While the second pinch roller 169 is urged toward the second conveying roller 168 by, for example, a coil spring, which is not shown, a rolling surface of the second pinch roller 169 is urged against a rolling surface of the second conveying roller 168. The second conveying roller 168 is coupled with the LF conveying motor through a driving force transmitter, which is not shown, and is driven by the driving force from the LF conveying motor to rotate.

In the lower conveyer path 159, at a position downstream from the second rollers 168, 169, the document sensor 116 is arranged. The document sensor 116 may detect a leading edge and a trailing edge of the original document 12 being conveyed by the second rollers 168, 169.

In the lower conveyer path 159, at a position downstream from the document sensor 116, the second image reading unit 94 is arranged. The second image reading unit 94 includes the second CIS 95, a second platen 96, and a document supporting member 97. The second image reading unit 94 may read the second side 52 of the original document 12. The second CIS 95 may optically read the image of the original document 12 being conveyed in the conveyer path 151 in the same manner as the first CIS 85.

The second CIS 95 is located to face an upper surface of the second platen 96. The second CIS 95 is located at a position in the conveyer path 151 upstream from the first CIS 85 in the conveying orientation 17. The second CIS 95 has a shape of a rectangular block and is mounted on the upper surface of the second platen 96. The second CIS 95 has a reading surface 120, an upstream edge 121, and a downstream edge 122.

The upstream edge 121 is an edge of the second CIS 95 on an upstream side in the conveying orientation 17. The downstream edge 122 is an edge of the second CIS 95 on a downstream side in the conveying orientation 17. The upstream edge 121 is located to be higher than the downstream edge 122 along the conveying orientation 17.

The second platen 96 is located above the lower conveyer path 159. The second platen 96 is a plate having a predetermined thickness. A lower surface of the second platen 96 is substantially parallel to the original document 12 being conveyed in the lower conveyer path 159.

The reading surface 120 spreads along the conveying orientation 17. The reading surface 120 is substantially parallel to the original document 12 being conveyed in the lower conveyer path 159.

The document supporting member 97 is, as shown in FIG. 4, located at a position to face the reading surface 120 of the second CIS 95 across the conveyer path 151. The document supporting member 97 will be described further below.

In the lower conveyer path 159, the positioning member 83 is located at a position downstream from the second image reading unit 94 in the conveying orientation 17. A leftward side of the positioning member 83, i.e., a downstream side in the conveying orientation 17, forms a slant surface, which inclines downward to the left along the conveying orientation 17, to guide the original document 12 passing through the second image reading unit 94 to a position between the platen glass 80 and the first document guide 173.

Along the lower conveyer path 159, the first image reading unit 32 is located at a position downstream from the positioning member 83 in the conveying orientation 17. The first image reading unit 32 may read an image of the first side 51 of the original document 12.

The first document guide 173 is located in the document cover 30 at a position to face the first image reading unit 32. The first document guide 173 includes a horizontal part, which faces the readable range 80A, and slant parts, which extend obliquely upward from an upstream end and a downstream end of the horizontal part. The first document guide 173 is urged toward the readable range 80A by a spring member fixed to the ADF body 152. At both ends of the horizontal part of the first document guide 173 in the front-rear direction 8, downward protrusions are formed. With the protrusions contacting the readable range 80A, a clearance in the vertical direction 7, through which the original document 12 may pass, is reserved between the horizontal part of the first document guide 173 and the readable range 80A.

The curved path 157 in the conveyer path 151 starts from a position in vicinity to an exit of the readable range 80A, extends upward, and curves from left to right in FIG. 4. A downstream end of the curved path 157 in the conveying orientation 17 is continuous with the upper conveyer path 160. The curved path 157 has an inner conveyance guide surface, which is formed of the third conveying roller 171, and an outer conveyance guide surface, which is formed of a part of the ADF body 152 and a part of the ADF cover 153.

Along the curved path 157, the third rollers 171, 172 are arranged. The third conveying roller 171 is located on an inner side of the curved path 157, and the third pinch roller 172 is located on an outer side of the curved path 157. The third conveying roller 171 and the third pinch roller 172 are partly exposed to the curved path 157.

The third pinch roller 172 is urged toward the third conveying roller 171 by, for example, a coil spring, which is not shown. Therefore, the in the curved path 157, a rolling surface of the third pinch roller 172 is urged against a rolling surface of the third conveying roller 171. The third conveying roller 171 is coupled with the LF conveying motor through a driving force transmitter, which is not shown, and is driven by the driving force from the LF conveying motor to rotate.

In an upstream area in the upper conveyer path 160 along the conveying orientation 17, an ejecting chute section 158 is formed. The ejecting chute section 158 has an upper guiding surface, which is formed of an inner surface of the ADF cover 153. The ejecting chute section 158 has a lower guiding surface, which is formed of the upper tray 179 and a slant section 180 formed continuously leftward from the upper tray 179. The ejecting chute section 158 serves as a passage having a predetermined dimension in the vertical direction 7 delimited by these guiding surfaces. When the original document 12 is conveyed to the ejecting chute section 158, the original document 12 may be guided to the ADF ejection tray 34 by the guiding surfaces of the ejecting chute section 158. The upper tray 179 is located to be higher than a nipping position between the third rollers 171, 172, and an upper end of the slant surface of the slant section 180 is located to be higher than the nipping position between the third rollers 171, 172.

The spring piece 190 is arranged in the ejecting chute section 158. The spring piece 190 may support the trailing end of the original document 12 entering the ejecting chute section 158. The spring piece 190 is formed approximately in an L-bent shape in a cross-sectional view and is located at an immediately downstream position with respect to the nipping position between the third rollers 171, 172 in the conveying orientation 17. The spring piece 190 may be a resilient plate member made of, for example, synthetic resin such as polyethylene terephthalate (PET), having a thickness which is approximately from 0.2 mm to 1.00 mm. The spring piece 190 may deform vertically in the cross-sectional view according to an intensity of a load being applied thereto.

Figure 5:
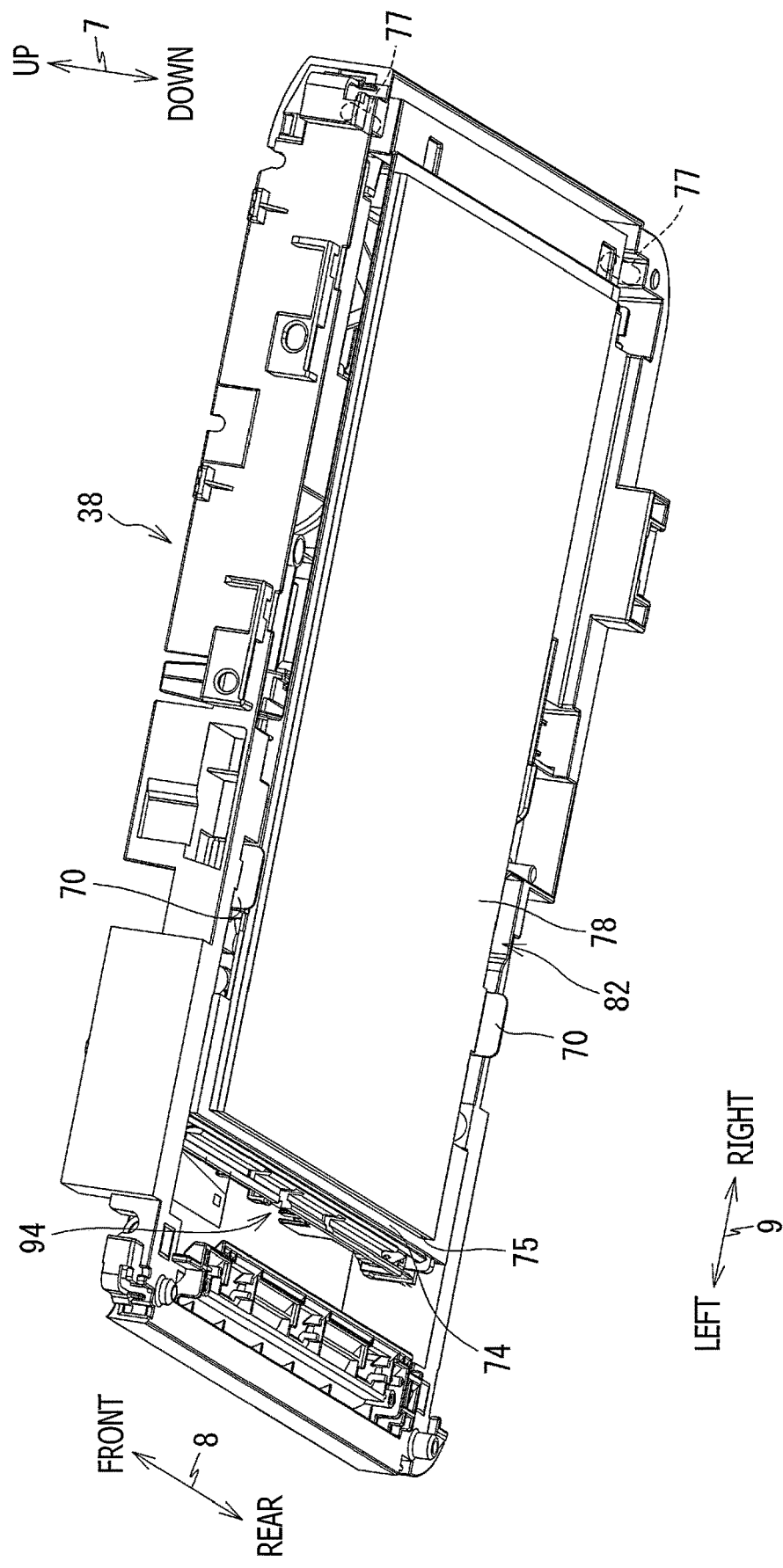
FIG. 5 is a perspective view of a lower section 38 of the document cover 30 according to the embodiment of the present disclosure.
Figure 6:
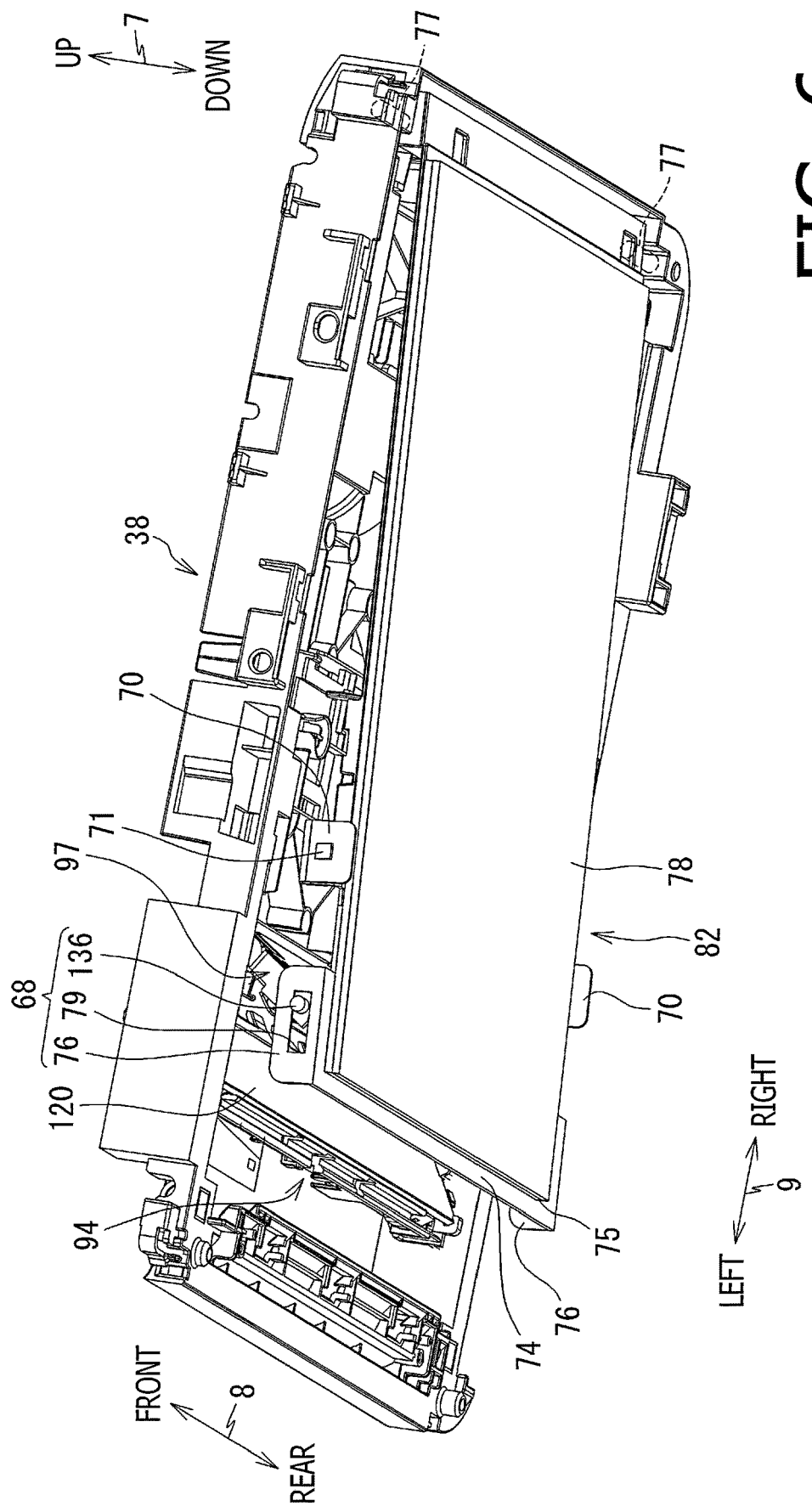
FIG. 6 is a perspective view of the lower section 38 of the document cover 30 according to the embodiment of the present disclosure, with a pressing plate 82 removed from a lower side of the document cover 30.

FIG. 5 is a perspective view of a lower section 38 of the document cover 30, with the pressing plate 82 attached to the lower side of the document cover 30. FIG. 6 is a perspective view of the lower section 38 of the document cover 30, with the pressing plate 82 removed from the lower side of the document cover 30.

Figure 7:
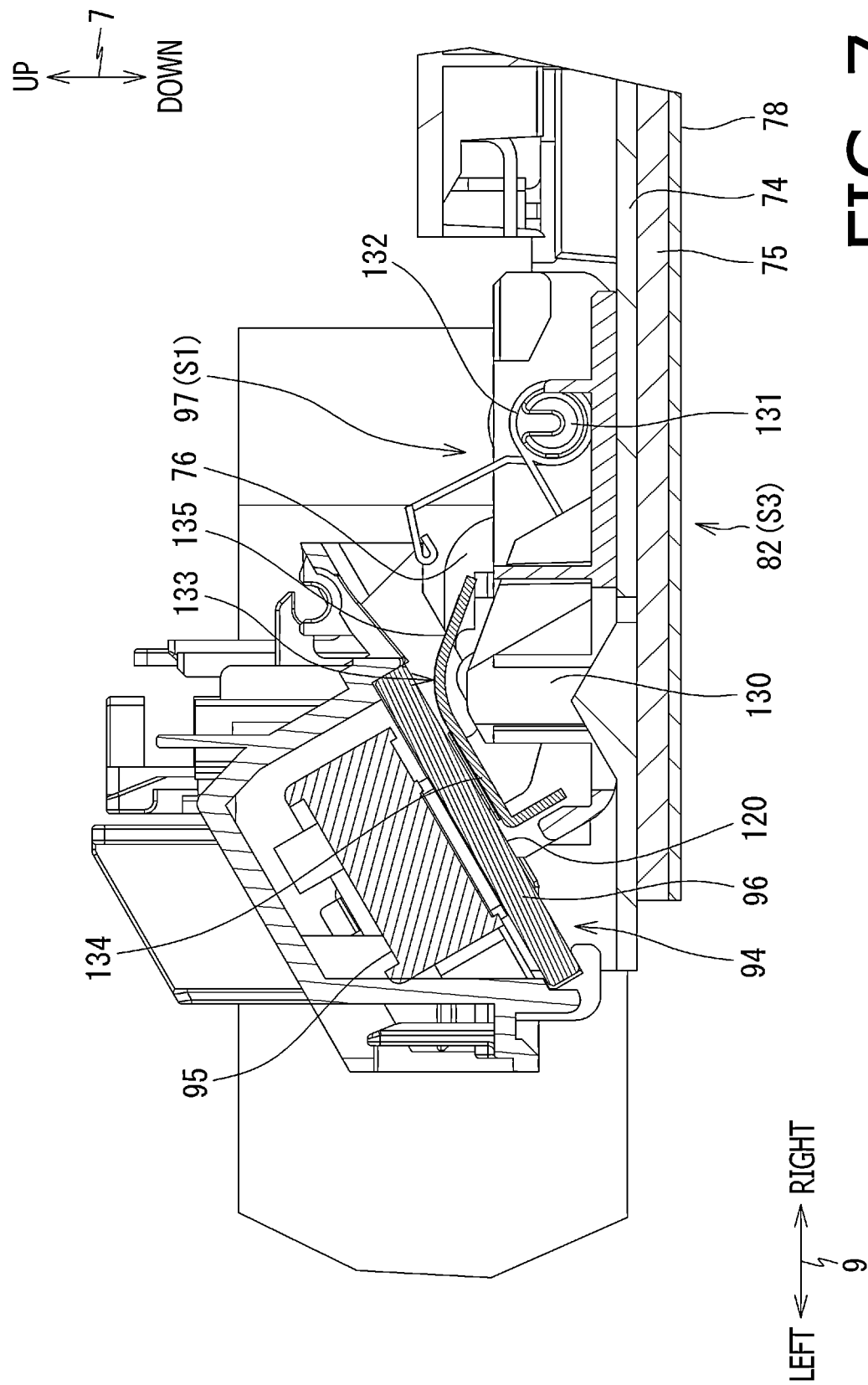
FIG. 7 is an enlarged cross-sectional view of an area including a document supporting member 97 according to the embodiment of the present disclosure.
Figure 8:
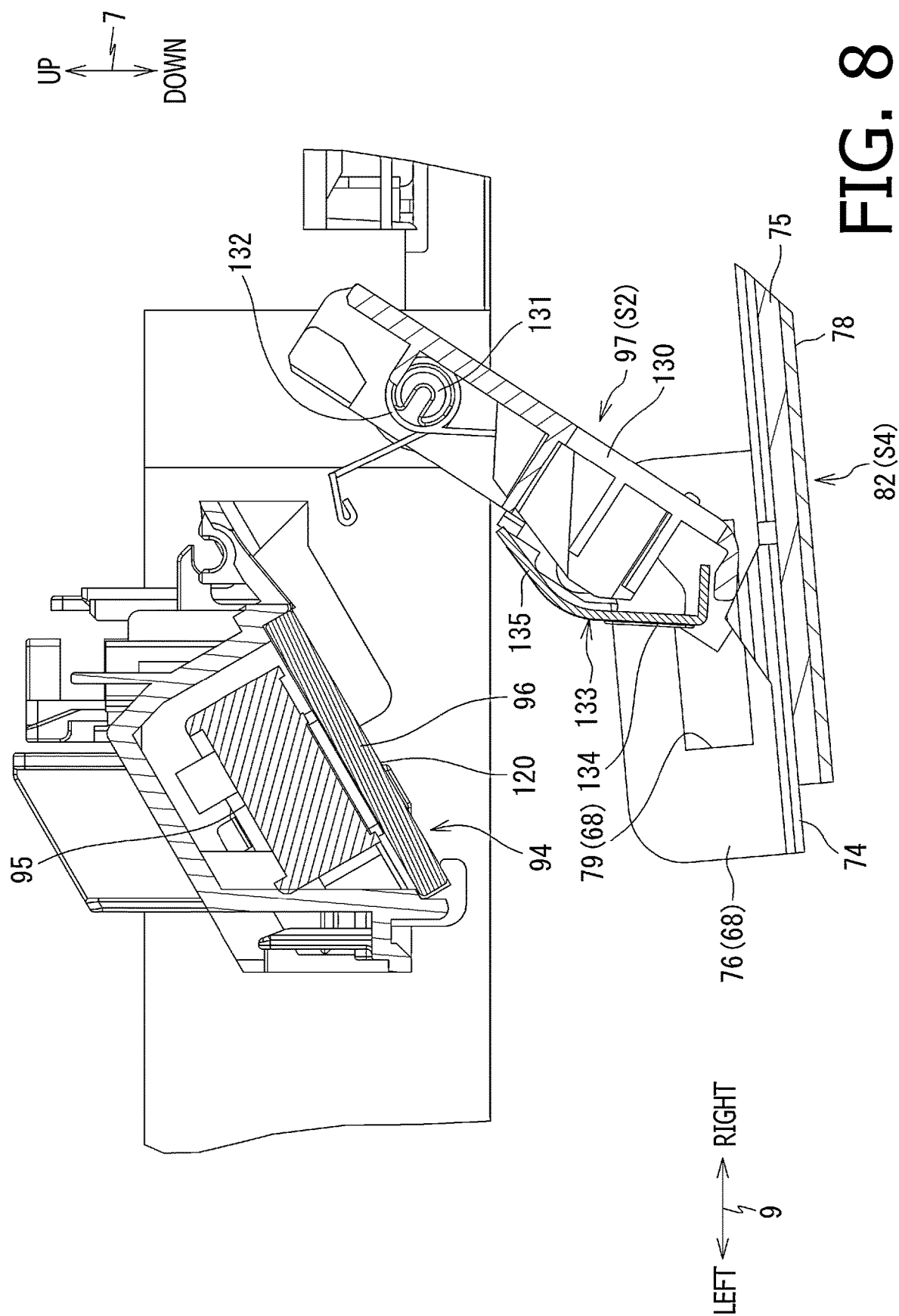
FIG. 8 is an enlarged cross-sectional view of the area including the document supporting member 97, with the document supporting member 97 located at a second position S2 and the pressing plate 82 located at a fourth position S4, according to the embodiment of the present disclosure.

The pressing plate 82 is movable between a third position S3, in which the pressing plate 82 is attached to the lower side of the document cover 30, and a fourth position S4, in which the pressing plate 82 is removed from the lower side of the document cover 30, as shown in FIGS. 7 and 8, respectively (see also FIGS. 5 and 6). The pressing plate 82 includes a plate section 74, a sponge section 75, a protrusive part 76, a hooking arm 70, and a pressing-plate pivot shaft 77.

The plate section 74 is a rectangular plate member and covers a lower area of the document cover 30. On a lower surface of the plate section 74, the sponge section 75 is arranged.

The sponge section 75 is formed of a porous material such as sponge. The sponge section 75 is arranged to fit on the lower surface of the plate section 74. The sponge section 75 has a predetermined thickness to absorb impact on the document cover 30 and the platen glass 80 and to improve closeness between the platen glass 80 and the original document 12 when the document cover 30 is closed. On an entire lower surface of the sponge section 75, in order to receive a substantial amount of reflective light from the original document 12, a white-colored reflector section 78 is arranged.

The protrusive part 76 includes a pair of protrusive parts 76, one and the other of which are arranged on a leftward-front end and a leftward-rear end of the plate section 74, respectively. The protrusive parts 76 protrude upward from the plate section 74. Each of the protrusive parts 76 has a rectangular through hole 79, which is longer in a longitudinal direction of the pressing plate 82 of the pressing plate 82, i.e., in the crosswise direction 9 when the pressing plate 82 is in the third position S3.

The hooking arm 70 includes a pair of hooking arms 70, one and the other of which are arranged rightward with respect to the one and the other of the paired protrusive parts 76, respectively, in the pressing plate 82 when the pressing plate 82 is in the third position S3. The hooking arms 70 protrude upward from the plate section 74. Each of the hooking arms 70 has a claw 71, which may engage with a hook (not shown) arranged on the document cover 30. When the hooking arms 70 are engaged with the hooks, the pressing plate 82 is located at the third position S3.

The pressing-plate pivot shaft 77 includes a pair of pressing-plate pivot shafts 77, which are, as indicated in broken lines in FIGS. 5-6, located in a rightward end area in the plate section 74. One and the other of the paired pressing-plate pivot shafts 77 protrude outward in the front-rear direction 8 from a frontward end and a rearward end of the plate section 74, respectively. The plate section 74 of the pressing plate 82 is supported by the pressing-plate pivot shafts 77 pivotably with respect to the document cover 30. In other words, the pressing plate 82 supported by the pressing-plate pivot shafts 77, which extend along the front-rear direction 8, or along the direction intersecting orthogonally with the crosswise direction 9, is pivotable around the pressing-plate pivot shafts 77 and is enabled to move between the third position S3 and the fourth position S4.

FIG. 7 is an enlarged cross-sectional view of an area including the document supporting member 97, which is located at a first position S1 to face the reading surface 120 of the second CIS 95, and the pressing plate 82 located at the third position S3. FIG. 8 is an enlarged cross-sectional view of the area including the document supporting member 97, which is located at a second position S2, and the pressing plate 82 located at the fourth position S4.

The document supporting member 97 includes a document supporting body 130, document-supporting-member pivot shafts 131, coil springs 132, and a second document guide 133.

The document supporting body 130 is in a size substantially equal to the second platen 96 of the second image reading unit 94 in the front-rear direction 8 and longer than the second platen 96 of the second image reading unit 94 in the crosswise direction 9. The document supporting body 130 includes document-supporting-member pivot shafts 131, which are arranged in frontward and rearward areas on a rightward side in the document supporting body 130.

The document-supporting-member pivot shafts 131 protrude outward in the front-rear direction 8, i.e., frontward and rearward, from the document supporting body 130. With the document-supporting-member pivot shafts 131 extending along the front-rear direction 8, the document supporting body 130 may pivot.

The coil springs 132 are wound around the document-supporting-member pivot shafts 131. One end of each coil spring 132 is fixed to the document supporting body 130, and the other end of each coil spring 132 is fixed to the document cover 30. The coil springs 132 urge the document supporting body 130 toward the first position S1.

The second document guide 133 is arranged on the document supporting body 130. The second document guide 133 is a plate member located at a position to face the second image reading unit 94. The second document guide 133 includes a guide-horizontal section 134, which faces the reading surface 120, and an upstream slant section 135, which may guide the original document 12 conveyed from an upstream side of the conveyer path 151 to the guide-horizontal section 134.

As shown in FIG. 6, connecting shafts 136 connect the document supporting member 97 with the pressing plate 82 in a rightward end area in the pressing plate 82. The connecting shafts 136 are located at positions on a leftward side in the document supporting body 130. The connecting shafts 136 protrude from the document supporting body 130 in the front-rear direction 8. The connecting shafts 136 are inserted in the through holes 79 in the protrusive parts 76.

According to the present embodiment, the scanner 3 has a connecting member 68, which links a pivoting end portion of the document supporting member 97 with the pressing plate 82 so that the document supporting member 97 may move in conjunction with the pressing plate 82 through the connecting member 68. The connecting member 68 may include, for example, but not limited to, the protrusive parts 76 and the connecting shafts 136. The connecting shafts 136 are arranged at positions leftward from the pressing-plate pivot shafts 77 in the crosswise direction 9, and the pressing-plate pivot shafts 77 of the document supporting member 97 are slidably retained in the through holes 79 of the pressing plate 82.

[Reading Images of Original Document 12 by ADF 12]

In the scanner 3 in the configuration as described above, the controller may control the conveyer 16, the first CIS 85, and the second CIS 95. The control to read images of the original document 12 by the controller will be described below with reference to FIG. 4.

For reading images of a plurality of sheets contained in the original document 12, a user may place the original document 12 on the ADF document tray 33 in a posture, in which the first sides 51 of the sheets in the original document 12 face downward. The user may enter a command, which causes the scanner 3 to start reading the original document 12, through the operation panel 6.

The controller receiving the command may drive a CR motor (not shown) and the LF motor (not shown). As the LF motor runs, and the draw-in roller 164, the separating roller 166, and the second conveying roller 168 may rotate, and a lowermost one of the sheets in the original document 12 may be conveyed from the ADF document tray 33. Moreover, as the CR motor runs, the first CIS 85 may move to a position in the readable range 80A.

The document sensor 116 may detect a leading edge of the sheet being conveyed from the original document 12 in the ADF document tray 33. The controller may control the sheet to be conveyed by a predetermined distance based on detection signals from the document sensor 116 and control the second CIS 95 and the first CIS 85 to start reading the image of the sheet.

The sheet from the original document 12 conveyed in the lower conveyer path 159 is in a posture, in which the first side 51 faces downward and the second side 52 faces upward. The second CIS 95 in the second image reading unit 94 may read the image on the second side 52 of the sheet.

The sheet, of which image on the second side 52 is read by the second image reading unit 94, may be guided by the positioning member 83 and reach the first image reading unit 32, and the first CIS 85 in the first image reading unit 32 may read the image on the first side 51 of the sheet passing over the readable range 80A. After the image on the first side 51 is read by the first CIS 85, the sheet may be conveyed to the curved path 157 in the ADF 5 with the leading edge being guided upward.

The sheet from the original document 12 conveyed to the curved path 157 may be further conveyed around an outer peripheral surface of the third conveying roller 171 curving from left to right. The third pinch roller 172 may be rotated by the rotation of the third conveying roller 171. The sheet may be pressed by the third pinch roller 172 against the third conveying roller 171, and the rotational force of the third conveying roller 171 may be applied to the sheet. Therefore, the sheet may be conveyed through the curved path 157 downstream to the upper conveyer path 160.

As the sheet from the original document 12 conveyed through the curved path 157 is nipped by the third conveying roller 171 and the third pinch roller 172 and further conveyed downstream in the conveying orientation 17, the leading edge of the sheet may climb the slant surface of the spring piece 190, which inclines upward to downstream in the conveying orientation 17. Meanwhile, with the weight of the sheet on the spring piece 190, the spring piece 190 may deform downward. Accordingly, the sheet may be supported resiliently by the spring piece 190 and guided downstream along the conveying orientation 17 in the ejecting chute section 158.

While the sheet from the original document 12 is being conveyed, the document sensor 116 may detect the trailing end of the sheet. The controller may convey the sheet by a predetermined distance based on the detection signals from the document sensor 116 and thereafter finish reading the images by the second CIS 95 and the first CIS 85. Further, the controller may convey the sheet with the images having been read by a predetermined distance to the ADF ejection tray 34 to eject.

Once the trailing edge of the sheet exits the nipping position between the third conveying roller 171 and the third pinch roller 172, an amount of the load on the spring piece 190 may be reduced to a weight from the trailing end part of the sheet alone. Therefore, the trailing end part of the sheet may be lifted upward by the resilient force of the spring piece 190. The sheet guided to the upper tray 179 may be guided to the ADF ejection tray 34, which is located downstream in the conveying orientation 17.

The lowermost one of the sheets in the original document 12 placed on the ADF document tray 33 may be thus conveyed by the draw-in roller 164 and the separating roller 166 and further conveyed by the second conveying roller 168. Meanwhile, a conveying velocity to convey the sheet by the separating roller 166 and the second conveying roller 168 is faster than a conveying velocity to convey the sheet by the draw-in roller 164. Therefore, when the sheet is conveyed by the separating roller 166 and the second conveying roller 168, the draw-in roller 164 may be pulled by the separating roller 166 and the second conveying roller 168 through the sheet, and the draw-in roller 164 may stop rotating while a key (not shown) in a rotating shaft and a key groove (not shown) in the draw-in roller 164 are separated, until the key catches up with the key groove. Therefore, the trailing edge of the lowermost one of the sheets in the original document 12 and a leading edge of a next lowermost one of the sheets in the original document 12 may be separated by a predetermined distance. Thus, the plurality of sheets in the original document 12 may be separated from one another by the predetermined distance to be conveyed one after another in the ADF 5, and the images on the first side 51 and the second side 52 of each of the sheets conveyed one after another may be read by the first CIS 85 and the second CIS 95 respectively. Thereafter, the sheets may be ejected one after another to rest on the ADF ejection tray 34.

[Maintenance of Second CIS 95]

The user may follow a procedure as below to perform maintenance works to the second CIS 95. The user may expose the pressing plate 82 by moving the document cover 30 in the direction P1 (see FIG. 2) to the open position. The user may pull a leftward part of the exposed pressing plate 82 frontward to move the pressing plate 82 from the third position S3 to the fourth position S4 (see FIGS. 5-6 and 7-8). In other words, the user may pivot the pressing plate 82 around the pressing-plate pivot shafts 77, which are located in the rightward end area in the pressing plate 82, in an orientation to separate from the document cover 30. Meanwhile, in conjunction with the pivoting movement of the pressing plate 82, the document supporting member 97 may move from the first position S1 to the second position S2, at which the document supporting member 97 is separated farther from the reading surface 120 of the second CIS 95 than the document supporting member 97 located at the first position S1.

In particular, as the pressing plate 82, including the protrusive parts 76, pivots in the orientation to separate from the document cover 30, the connecting shafts 136 inserted in the through holes 79 in the protrusive parts 76 may move to slide rightward within the through holes 79. As the connecting shafts 136 move rightward, the document supporting member 97 located to face the reading surface 120 of the second CIS 95 may move from the first position S1 to the second position S2. While the document supporting member 97 moves from the first position S1 to the second position S2, the document supporting member 97 is urged by the coil spring 132 toward the first position S1. Therefore, the user may support the pressing plate 82 at the leftward area against the urging force of the coil spring 132 to hold the document supporting member 97 at the fourth position S4.

While the pressing plate 82 is at the fourth position S4, the document supporting member 97 is located at the second position S2. Therefore, between the document supporting member 97 and the reading surface 120 of the second CIS 95, a clearance to accept the user's hand may be created (see FIG. 8). Through the clearance, the user may perform maintenance works such as, for example, cleaning the reading surface 120 of the second CIS 95 and the second document guide 133 by wiping with cloth.

After cleaning the reading surface 120 and the second document guide 133, the user may push the pressing plate 82 back from the fourth position S4 to the third position S3. In other words, the user may move the pressing plate 82 to pivot around the pressing-plate pivot shafts 77 and attach the pressing plate 82 to the lower side of the document cover 30. As the pressing plate 82 moves to be attached to the lower side of the document cover 30, the document supporting member 97 may move in conjunction with the pressing plate 82 from the second position S2 to the first position S1 (see FIGS. 6 and 5).

In particular, as the pressing plate 82, including the protrusive parts 76, pivots in an orientation to approach the lower side of the document cover 30, the connecting shafts 136 inserted in the through holes 79 in the protrusive parts 76 may move to slide leftward in the through holes 79. As the connecting shafts 136 move leftward, the document supporting member 97 may move from the second position S2 to the first position S1 (see FIG. 7). The document supporting member 97 moved to the first position S1 is located to face the reading surface 120.

Thus, the pressing plate 82 may be attached to the lower side of the document cover 30, the document cover 30 may return to the closed position, and the second CIS 95 may be placed in a readable condition to read the second side 52 of the sheet.

BENEFITS BY THE EMBODIMENT

According to the embodiment described above, when the pressing plate 82, which contacts the platen glass 80 when the document cover 30 is at the closed position, is removed from the lower side of the document cover 30, the document supporting member 97 facing the reading surface 120 of the second CIS 98 may move to the second position S2. Therefore, maintenance works to the second CIS 95, such as cleaning the reading surface 120 of the second CIS 95, may be performed easily.

Moreover, according to the embodiment of the present disclosure, the pressing plate 82 may pivot around the pressing-plate pivot shafts 77, which are located rightward with respect to the readable range 80A, and the document-supporting-member pivot shafts 131 are located leftward with respect to the pressing-plate pivot shafts 77. Therefore, the document supporting member 97 may pivot by a greater angle than a pivotable angle of the pressing plate 82, and the maintenance works may be performed more easily.

Moreover, according to the embodiment of the present disclosure, the document supporting member 97 may be located at a correct position with respect to the reading surface 120 of the second CIS 95 accurately by being located at the first position S1.

Modified Examples

An example modified from the embodiment will be described below. The linkage mechanism to move the document supporting member 97 from the first position S1 to the second position S2 in conjunction with the pressing plate 82 may not necessarily be limited to the connecting member 68 including the protrusive parts 76 on the pressing plate 82 and the connecting shafts 136 on the document supporting member 97 but may include, for example, a mechanism described below.

Figure 9:
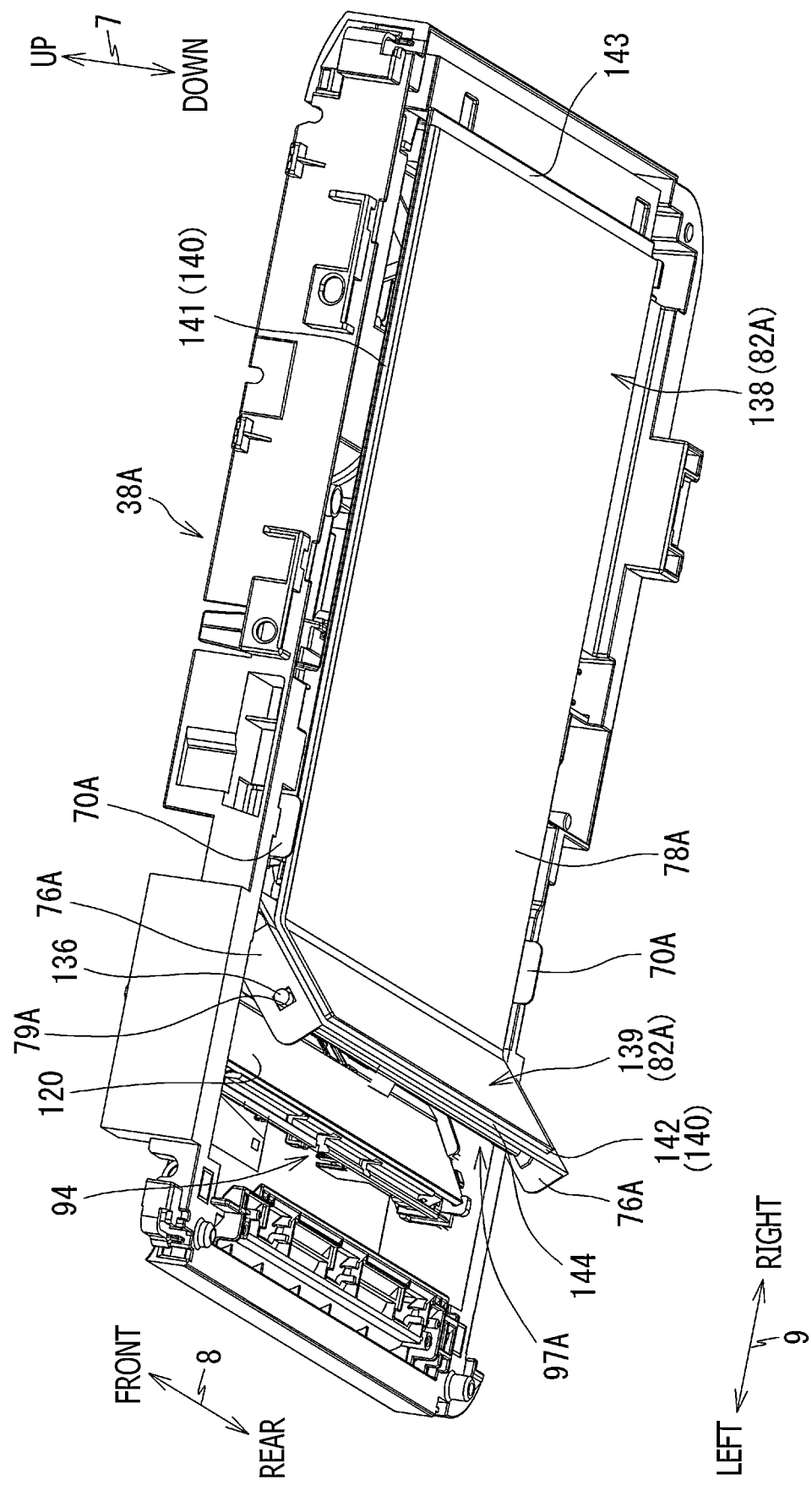
FIG. 9 is a perspective view of a lower section 38A of a scanner according to a modified example of the embodiment of the present disclosure.
Figure 10:
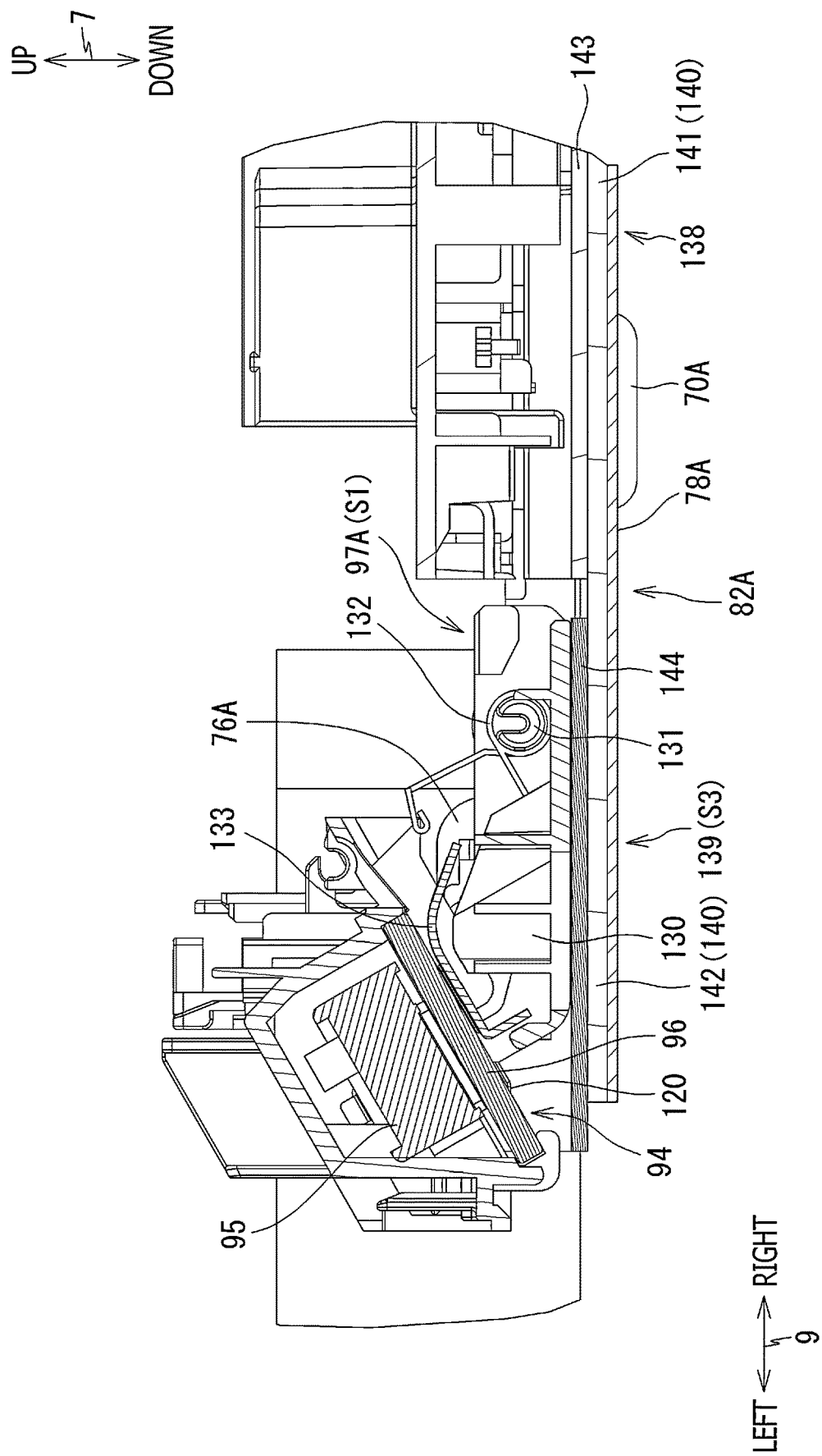
FIG. 10 is an enlarged cross-sectional view of an area including a document supporting member 97A according to the modified example of the embodiment of the present disclosure.

FIG. 9 is a perspective view of the lower section 38A of the document cover. FIG. 10 is an enlarged cross-sectional view of an area including a document supporting member 97A. The scanner in the modified example has a pressing plate 82A arranged to contact the platen glass 80 in place of the pressing plate 82. The pressing plate 82A is located to be lower than the second CIS 95. The pressing plate 82A has a first section 138 and a second section 139. On a lower side of the first section 138 and the second section 139, a sponge part 140 connecting the first section 138 and the second section 139 is arranged. The sponge part 140 includes a first sponge part 141 and a second sponge part 142, which form a lower part of the first section 138 and a lower part of the second section 139, respectively. On a lower side of the sponge part 140, a reflector 78A is arranged.

The first section 138 is a plate member fixed to the lower side of the document cover. The first section 138 may be hooked to the document cover with hooking arms 70A. The first section 138 covers a rightward area of the lower section 38A of the document cover from below. The first section 138 includes a first plate part 143 and the first sponge part 141, The first plate part 143 has a rectangular shape elongated in the crosswise direction 9. The first sponge part 141 is adhered to a lower surface of the first plate part 143.

The second section 139 is a plate member movable between a third position S3, in which the pressing plate 82A is attached to the lower side of the document cover, and a fourth position S4, in which the pressing plate 82A is removed from the lower side of the document cover. The second section 139, when located at the third position S3, may be hooked to the document cover with hooking arms (not shown). The second section 139 may, when located at the third position S3, cover a leftward area of the lower section 38A of the document cover from below. The second section 139 includes a second plate part 144, the second sponge part 142, and a protrusive part 76A.

The second plate part 144 is a rectangular plate member elongated in the front-rear direction 8. A length of the second plate part 144 in the front-rear direction 8 is equal to a length of the first plate part 143 in the front-rear direction 8. The second sponge part 142 is adhered to a lower surface of the second plate part 144.

The protrusive part 76A includes a pair of protrusive parts 76A, one and the other of which are arranged on a frontward end and a rearward end of the second plate part 144, respectively. The protrusive parts 76A protrude upward from the second plate part 144. Each of the protrusive parts 76A has a rectangular through hole 79A.

The sponge part 140 has flexibility and may bend at a boundary between the first sponge part 141 and the second sponge part 142 when the second section 139 moves from the third position S3 to the fourth position S4.

The document supporting member 97A of the MFD 1 according to the modified example of the present disclosure may be arranged on the second section 139, as shown in FIG. 10. The document supporting member 97A includes a document supporting body 130, a document-supporting-member pivot shaft 131 including a pair of document-supporting-member pivot shafts 131, a coil spring 132 including a pair of coil springs 132, and a second document guide 133. The document supporting member 37A has a connecting shaft 136, including a pair of connecting shafts 136, at a leftward position. The connecting shafts 136 are inserted in the through holes 79A in the protrusive parts 76A on the second section 139. The connecting shafts 136 support the second section 139 pivotably. The reminder of the document supporting member 97A may be in the same configuration as the document supporting member 97 in the embodiment described above.

Figure 11:
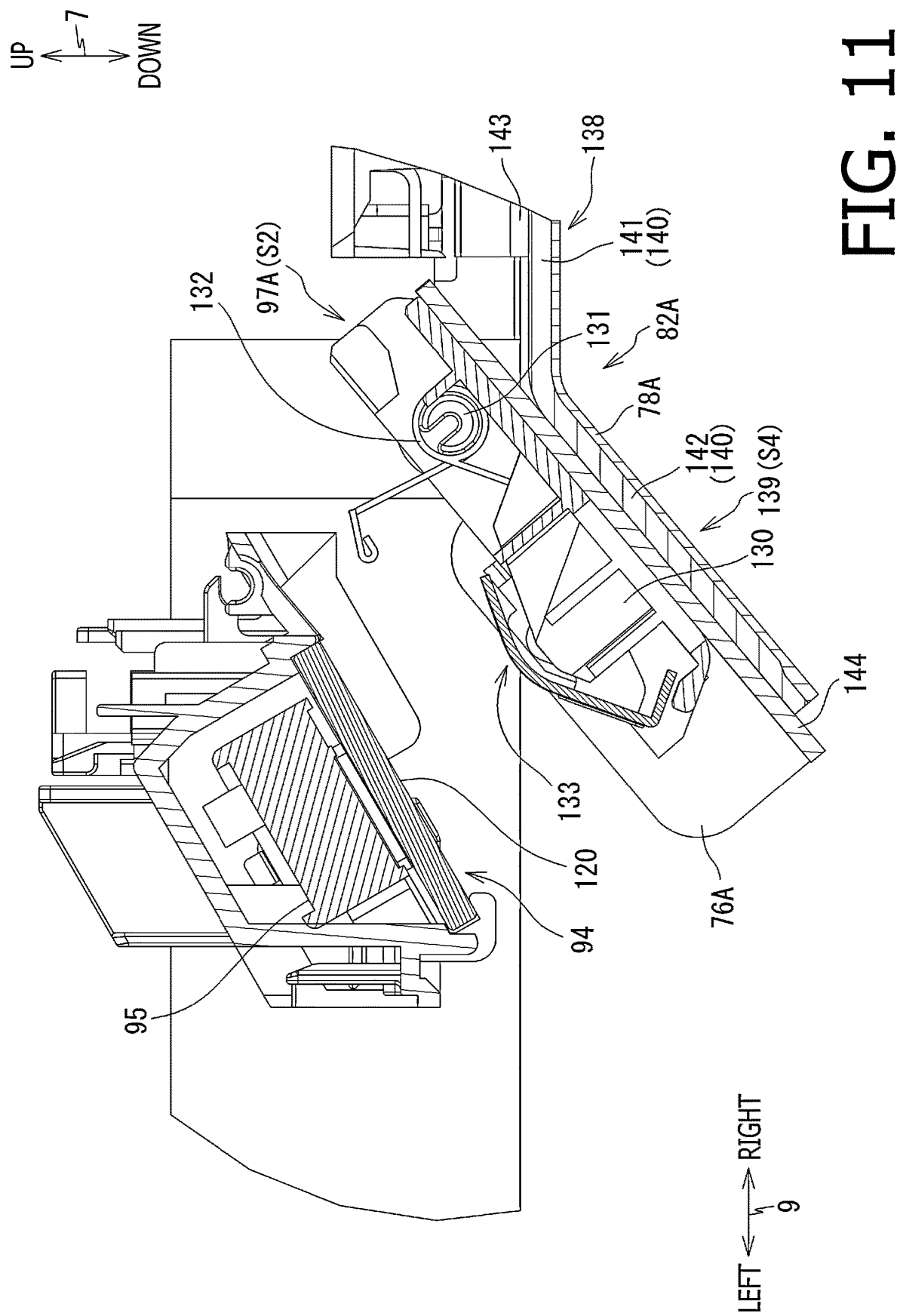
FIG. 11 is an enlarged cross-sectional view of the area including the document supporting member 97A, with the document supporting member 97A located at a second position S2 and a pressing plate 82A located at a fourth position S4, according to the modified example of the embodiment of the present disclosure.

FIG. 11 is an enlarged cross-sectional view of the area including the document supporting member 97A, with the document supporting member 97A located at the second position S2 and the pressing plate 82A located at the fourth position S4.

The document supporting member 97A is movable between the first position S1, in which the document supporting member 97A faces the reading surface 120, and the second position S2, in which the document supporting member 97A is separated from the reading surface 120. The document supporting member 97A may pivot around the document-supporting-member pivot shafts 131. The document supporting member 97A is fixed on the second plate part 144 in the second section 139 and is pivotable along with the second section 139.

[Maintenance of Second CIS 95 in the Modified Example]

The user may follow a procedure as below to perform maintenance works to the second CIS 95 in the modified example.

The user may expose the pressing plate 82A by moving the document cover in the direction P1 (see FIG. 2) to the open position. The user may pull a leftward part of the second section 139 of the exposed pressing plate 82A frontward to move the second section 139 from the third position S3 to the fourth position S4 (see FIG. 9). In other words, the user may pivot the second section 139 around the document-supporting-member pivot shafts 131, which are located in the rightward area in the document supporting member 97A, in an orientation to separate from the document cover. Meanwhile, in conjunction with the pivoting movement of the second section 139, the document supporting member 97A may move from the first position S1 to the second position S2.

In particular, as the second section 139 of the pressing plate 82A pivots in the orientation to separate from the lower side of the document cover, the document supporting member 97A fixed to the second section 139 may move from the first position S1 to the second position S2 simultaneously. While the document supporting member 97A moves from the first position S1 to the second position S2, the document supporting member 97A is urged by the coil springs 132 toward the first position S1. Therefore, the user may support the pressing plate 82A at the second section 139 against the urging force of the coil springs 132 to hold the document supporting member 97A at the fourth position S4.

While the second section 139 is at the fourth position S4, the document supporting member 97A is located at the second position S2. Therefore, between the document supporting member 97A and the reading surface 120 of the second CIS 95, a clearance to accept the user's hand may be created (see FIG. 11). Through the clearance, while the second section 139 is maintained at the fourth position S4, the user may perform maintenance works such as, for example, cleaning the reading surface 120 of the second CIS 95 and the second document guide 133 by wiping with cloth.

After cleaning the reading surface 120 and the second document guide 133, the user may push the second section 139 from the fourth position S4 back to the third position S3. In other words, the user may move the second section 139 to pivot around the document-supporting-member pivot shafts 131 and attach the second section 139 to the lower side of the document cover. As the second section 139 moves to be attached to the lower side of the document cover, the document supporting member 97A may move in conjunction with the second section 139 from the second position S2 to the first position S1.

In particular, as the second section 139 of the pressing plate 82A pivots in the direction to approach the lower side of the document cover, the document supporting member 97A fixed to the second section 139 may move from the second position S2 to the first position S1 (see FIG. 10). The document supporting member 97A moved to the first position S1 is located to face the reading surface 120.

Thus, the second section 139 may be attached to the lower side of the document cover, the document cover may return to the closed position, and the second CIS 95 may be placed in a readable condition to read the second side 52 of the sheet.

Benefits by the Modified Example

According to the modified example of the present disclosure, the pressing plate 82A has the second section 139, which is movable between the third position S3 and the fourth position S4. When the second section 139 is located at the third position S3, the document supporting member 97A is located at the first position S1; and when the second section 139 is located at the fourth position S4, the document supporting member 97A is located at the second position S2. Thus, the document supporting member 97A may move to the second position S2 by the pivoting movement of the second section 139 rather than the entire pressing plate 82A. Therefore, the maintenance works on the second CIS 95 may be performed with a less amount of load for moving the pressing plate 82A.

Although examples of carrying out the invention have been described, those skilled in the art will appreciate that there are numerous variations and permutations of the reading apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

For example, the conveyer 16 may not necessarily consist of the draw-in roller 164, the draw-nipping piece 165, the separating roller 166, the separator-nipping piece 167, the second conveying roller 168, the second pinch roller 169, the third conveying roller 171, and the third pinch roller 172, but the conveyer 16 may be in a different configuration.

For another example, the ADF 5 may not necessarily in the down-to-up formation, in which the original document 12 is conveyed from the ADF document tray 33 in the lower tier to the ADF ejection tray 34 in the upper tier, but may be in an up-to-down formation, in which the original document 12 may be conveyed from the an ADF document tray in an upper tier to an ADF ejection tray in a lower tier.

For another example, the quantity and/or arrangement of the rollers in the conveyer 16 of the ADF 5 described above are merely examples and may be modified optionally.

For another example, the document supporting member 97 may not necessarily have the coil springs 132 to urge the document supporting body 130 toward the first position S1, but the coil springs 132 may be omitted from the document supporting member 97. In other words, the document supporting member 97 may not necessarily urge the document supporting body 130 toward the first position S1.

For another example, the shape of through holes 79 may not necessarily be limited to the rectangle elongated in the longitudinal direction of the pressing plate 82 as long as the connecting shafts 136 in the document supporting member 97 are slidable along the longitudinal direction of the plate section 74. For example, the through holes 79 may be replaced with grooves extending along the longitudinal direction of the pressing plate 82. Moreover, the connecting shafts 136 may be separable from the through holes 79.

What is claimed is:
1. A reading apparatus, comprising:
a platen glass, on which an original document is placeable;
a document cover movable with respect to the platen glass between an open position and a closed position, the document cover located at the closed position covering the platen glass;
a conveyer arranged inside the document cover, the conveyer being configured to convey the original document along a conveyer path;
a reading sensor arranged inside the document cover, the reading sensor being configured to read the original document conveyed along the conveyer path optically;
a document supporting member movable between a first position, at which the document supporting member faces a reading surface of the reading sensor across the conveyer path, and a second position, at which the document supporting member is separated farther from the reading surface than the document supporting member at the first position;
a pressing plate located at a lower side of the document cover, the pressing plate being movable between a third position, at which, when the document cover is at the closed position, the pressing plate is located to be lower than the reading sensor and contacts the platen glass, the pressing plate at the third position being attached to the lower side of the document cover, and a fourth position, at which the pressing plate is removed from the lower side of the document cover; and a linkage assembly configured to move the document supporting member from the first position to the second position in conjunction with the pressing plate moving from the third position to the fourth position.

2. The reading apparatus according to claim 1, further comprising:

a movable reading sensor located to be lower than the platen glass, the movable reading sensor being configured to move to a readable position and read the original document conveyed along the conveyer path optically thereat, wherein the pressing plate is movable between the third position and the fourth position by pivoting around a pivot axis located toward one side of the reading apparatus with respect to the readable position in a first direction, the pivot axis extending along a second direction intersecting orthogonally with the first direction;

wherein the document supporting member is movable between the first position and the second position by pivoting around a pivot axis extending along the second direction; and wherein the pivot axis of the document supporting member is located toward the other side of the reading apparatus with respect to the pivot axis of the pressing plate in the first direction.

3. The reading apparatus according to claim 2, wherein the linkage assembly includes a connecting member connecting a pivoting end portion of the document supporting member with the pressing plate.

4. The reading apparatus according to claim 1, further comprising a resilient member configured to urge the document supporting member toward the first position.

5. A reading apparatus, comprising:

a platen glass, on which an original document is placeable;

a document cover movable with respect to the platen glass between an open position and a closed position, the document cover located at the closed position covering the platen glass;

a conveyer arranged inside the document cover, the conveyer being configured to convey the original document along a conveyer path;

a reading sensor arranged inside the document cover, the reading sensor being configured to read the original document conveyed along the conveyer path optically;

a document supporting member movable between a first position, at which the document supporting member faces a reading surface of the reading sensor across the conveyer path, and a second position, at which the document supporting member is separated farther from the reading surface than the document supporting member at the first position; and a pressing plate located at a lower side of the document cover, the pressing plate, when the document cover is at the closed position, being located to be lower than the reading sensor and contacting the platen glass, the pressing plate including:

a first section fixed to the lower side of the document cover; and a second section movable between a third position, at which the second section is attached to the lower side of the document cover, and a fourth position, at which the second section is removed from the lower side of the document cover, wherein the document supporting member is arranged on the second section, and wherein the document supporting member is located at the first position when the second section is at the third position and is located at the second position when the second section is at the fourth position.

* * * * *

UNITED STATES PATENT AND TRADEMARK OFFICE
CERTIFICATE OF CORRECTION

| | | |
|---|---|---|
| PATENT NO. | : 11,736,635 B2 | Page 1 of 1 |
| APPLICATION NO. | : 17/712751 | |
| DATED | : August 22, 2023 | |
| INVENTOR(S) | : Mamoru Namba et al. | |

It is certified that error appears in the above-identified patent and that said Letters Patent is hereby corrected as shown below:

On the Title Page

Insert:
--(30) April 9, 2021 (JP) ........................ 2021-066548--

Signed and Sealed this
Twenty-fourth Day of October, 2023

Katherine Kelly Vidal
*Director of the United States Patent and Trademark Office*